United States Patent [19]

Selleck

[11] 4,273,240
[45] Jun. 16, 1981

[54] VARIABLE PITCH SPROCKETS FOR CONVEYOR SYSTEM

[75] Inventor: Robert W. Selleck, Los Gatos, Calif.

[73] Assignee: Becton, Dickinson and Company, Rutherford, N.J.

[21] Appl. No.: 6,908

[22] Filed: Jan. 26, 1979

[51] Int. Cl.³ ............................................. B65G 23/04
[52] U.S. Cl. ..................................... 198/835; 474/57
[58] Field of Search ............. 74/230.18, 230.2, 230.21, 74/230.22, 230.23, 244; 198/835; 425/168

[56] References Cited

U.S. PATENT DOCUMENTS

| 663,928 | 12/1900 | Pratt | 74/230.22 |
|---|---|---|---|
| 1,244,383 | 10/1917 | Snider | 198/835 X |
| 1,486,590 | 3/1924 | Landahl | 74/244 |
| 3,570,053 | 3/1971 | Rodrigues et al. | 425/168 |

Primary Examiner—Robert B. Reeves
Assistant Examiner—Douglas D. Watts
Attorney, Agent, or Firm—Kane, Dalsimer, Kane, Sullivan & Kurucz

[57] ABSTRACT

A conveyor system which includes at least one drive sprocket and a plurality of idler sprockets to mesh with a continuous conveying member adapted to carry the work load. Support structure is provided for mounting the sprockets thereon in a predetermined arrangement in position to mesh with the conveying member to drive and guide the conveying member along a predetermined path. The sprockets are capable of variable pitch adjustment to accommodate for a pitch variation in the conveying member and adjust the sprockets to continue to mesh with the conveying member over a continuing period of use.

29 Claims, 10 Drawing Figures

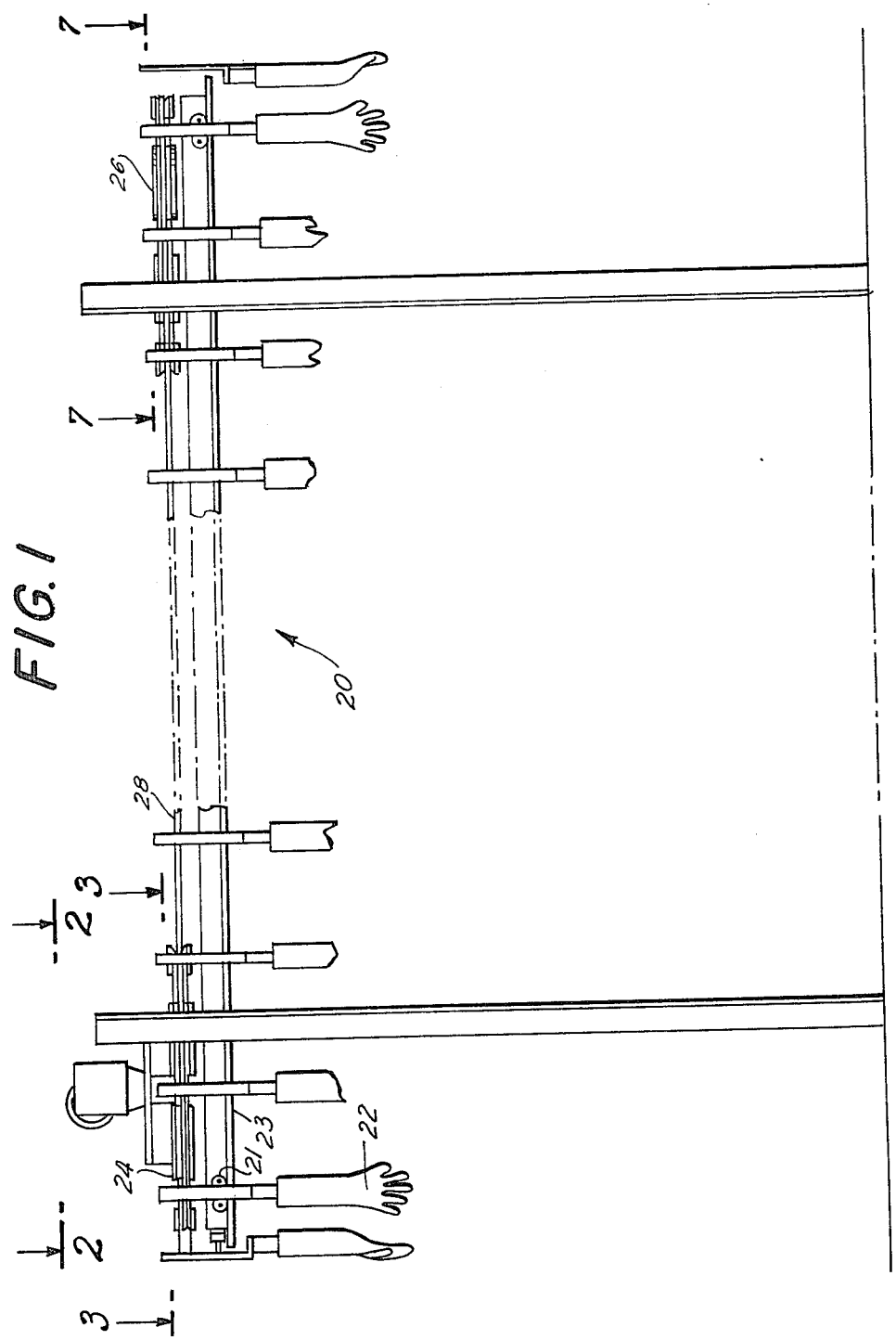

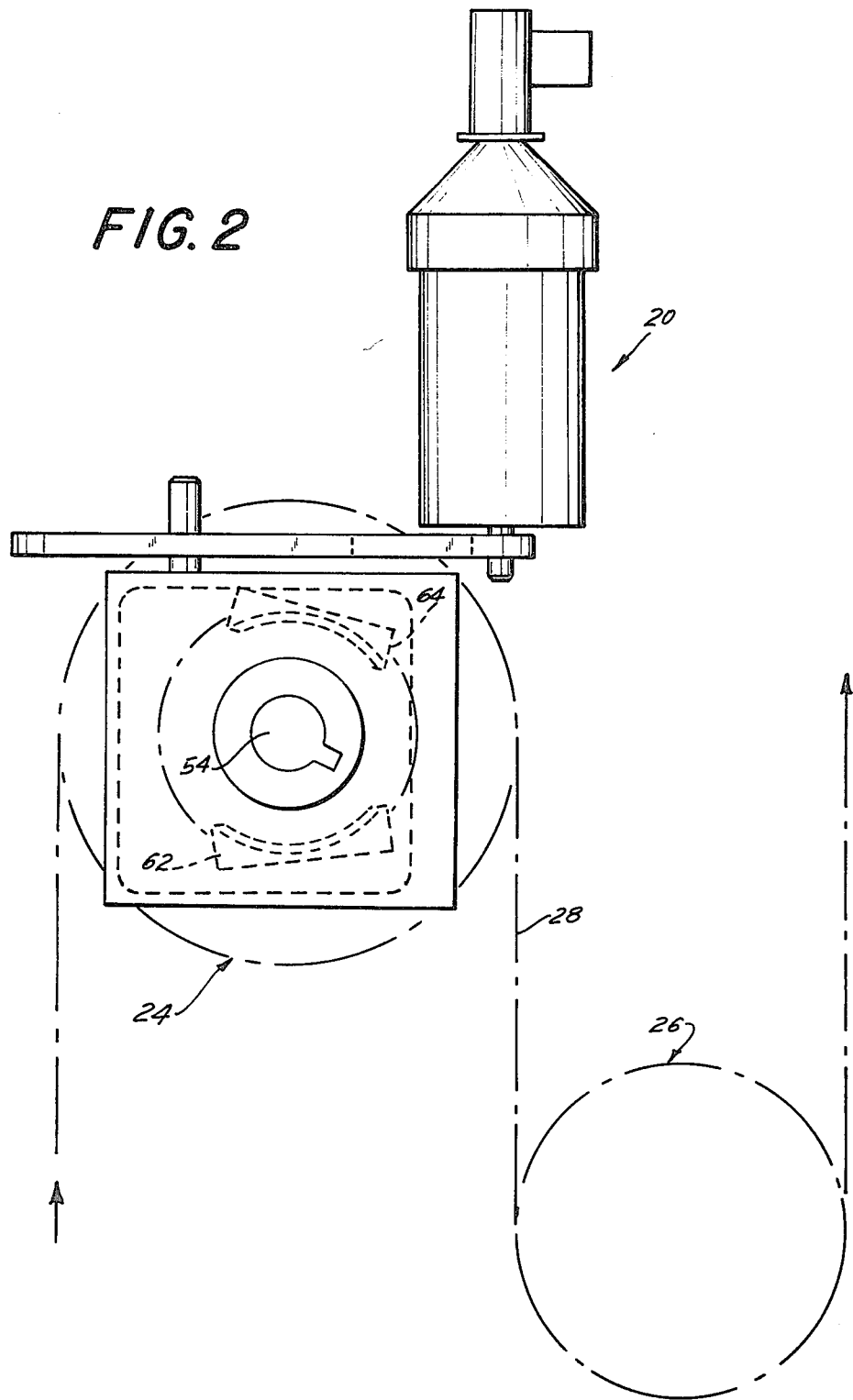

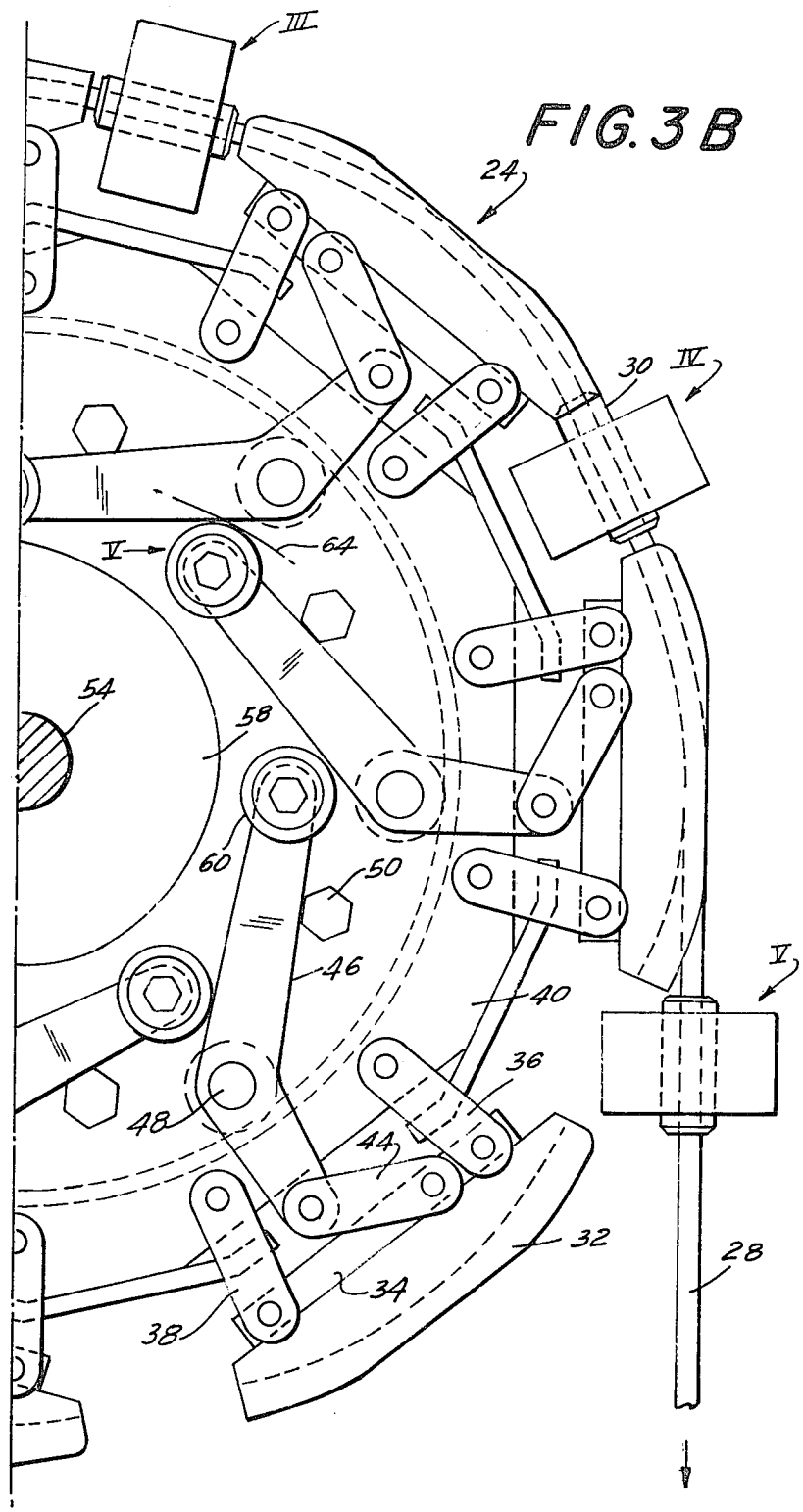

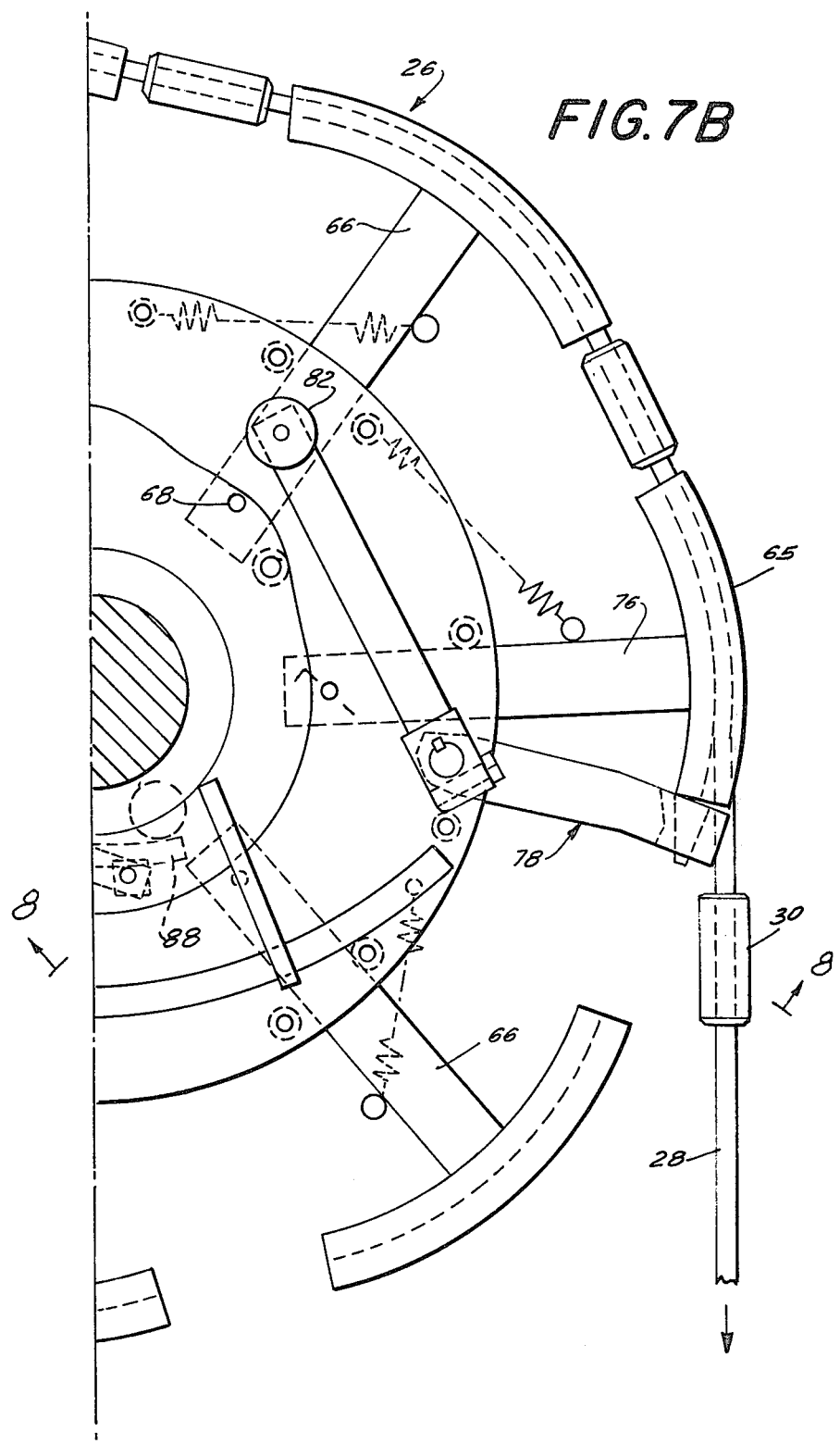

VARIABLE PITCH SPROCKETS FOR CONVEYOR SYSTEM

BACKGROUND OF THE INVENTION

Mechanical conveyor systems of a variety of different types and designs are employed for handling production lines in all phases of industry. For example, one area in which conveyor systems are used is in the dip molding of latex or vinyl gloves. For years, as shown in U.S. Pat. Nos. 3,117,341; 3,304,576; 3,369,271; 3,431,596; and 3,570,053, various types of machines have been used to carry work pieces or molds along a path of production steps including dipping into liquid latex or vinyl, rotating and shifting to curing stations to produce the desired shaping and curing, and transporting the product to a stripping location where the gloves or similar products are removed from the mold for use.

Throughout the years various types of conveyors have been employed including the well known types of chain and cable conveyors. One difficulty that occurs with all types of conveying systems is the problem of change in pitch as the cable stretches during use when subjected to loads and handling as the cable runs on a continuous travel path over a prolonged period of time. This is true whether the cable is run at high speeds or at relatively low speeds. At some time the cable will fail and naturally one major consideration in dealing with conveyor systems is longevity and dependability. The major difficulty that occurs when the cable or chain stretches is that the pitch changes between the elements mounted on the cable which must mesh with either idler or drive sprockets. The drive sprockets naturally match with the cable to direct it under power along the desired path. Primarily, the idler sprockets are used to guide the cable and change direction of the cable as it moves along the desired path in the manufacturing system.

As the pitch of the cable changes over a period of time, particularly as the cable lengthens, it reaches a point where it no longer meshes with the drive or idler sprockets causing interference and ultimate failure. The lack of ability to accommodate the change in pitch as the cable stretches during a long period of use sharply reduces cable life and increases the time during which the machine is not in operation.

In conventional chain and cable trolley conveyor practice, vertical idler sprockets are used only in limited ways like dipping the work piece in paint. Also vertical upward bends use the trolley wheels against the track to balance the chain or cable tension, rather than a vertical turn wheel with an interrupted track. Conventional chain and cable conveyors have no provision for inverting the work.

Stock cable trolley conveyors are similar in arrangement to the chain type trolley conveyors with the track on the top, the chain or cable is located fairly close to the lower track and the load or work piece hangs below the chain or cable. The cable trolley conveyor pitches are created by swageing buttons to the cable at the desired pitch. These become a permanent part of the cable and the trolleys fit around these buttons to receive their locations on the cable. While chain trolley conveyors utilize horizontal turn idler wheels to balance the chain tension force resulting from horizontal direction changes, cable trolley conveyors must utilize turn idler sprockets for the same purpose. The chain conveyor idler turn wheels are remarkably long lived, trouble free components, while the cable conveyor idler sprockets are short lived, troublesome components.

Both conveyor chains and conveyor cables increase in pitch throughout their period of use as discussed above. This fact has no effect on the chain idler turn wheels because they have smooth cylindrical surfaces, but aggravates the problem of proper meshing of the cable trolley brackets in the idler sprocket gaps that are positioned between the cable supporting shoes.

As discussed, the stock cable conveyor idler sprockets were troublesome components causing frequent cable failures for the lifetime of between 1 and 6 months. Accordingly, there has been clearly a need to provide a cable system which minimizes the change of cable failure for a prolonged period of time materially reduces cable wear, and accommodates cable pitch variation.

SUMMARY OF THE INVENTION

With the above background in mind, it is among the primary objectives of the present invention to provide a conveying system, particularly of the cable type which provides for long term use without material wear or danger of cable failure. The system is also adaptable for use in the drive of chain type conveyors. It is an objective to provide a variable pitch sprocket system whereby the sprockets are self-adjusting to accommodate for pitch changes in the cable and thus facilitates the use of the same cable for a longer period of time within the same drive and idler sprocket system. The ultimate objective is to provide an inexpensive drive and idler sprocket system for use with a conventional type of cable conveyor to provide a system of much greater longevity than previously available known systems. The variable pitch sprockets are designed to be used with many common types of manufacturing machine structures, for example in the use of a mold conveyor system for producing latex gloves.

More specifically, the conveyor system of the present invention is designed to utilize a plurality of drive sprockets and idler sprockets, both being of variable pitch design to direct a cable containing work pieces over a prolonged period of time while accommodating the change in cable pitch.

The stock drive sprocket pitch remains constant or even decreases due to shoe groove wear, while the cable button pitch continues to increase. These conditions resulted in an untenable maintenance situation and led to the development of the present invention in the form of the cammed drive sprocket. It is a fact that each button on the cable carries the load independently, in succession, through the distance of approximately one pitch. The only sharing of the load between two buttons occurs instantaneously as the load is transferred back to the adjacent following button.

To maximize the radius at which the cable seats in the shoes, and still accommodate the large change in the pitch difference between the sprocket and the cable button before the cable is used up, the shoes are bolted onto a hinged mechanism. This allows the shoes to be shimmed out to increase the pitch of the sprocket to correct for part of the cable stretch.

The cammed drive sprocket described above is designed to accommodate for change in pitch and similarly, the variable pitch idler sprockets are provided with responsive cammed structure to coordinate with change in pitch of the cable to facilitate meshing of the idler sprockets with the cable for continued use of the cable for an extended period of time. In this manner the most effective and long time use of the conveying system employing the cable or chain conveying member in combination with a plurality of drive sprockets for both systems and idler sprockets for cable system is provided for use on a conventional manufacturing line such as a latex glove manufacturing system.

In summary, the conveyor system of the present invention includes at least one drive sprocket and at least one idler sprocket. A continuous conveying member is adapted to carry a work load and to mesh with the sprockets. Support structure for the system is provided with the sprockets mounted thereon in a predetermined arrangement in position to mesh with the conveying member to drive and guide the conveying member along a predetermined path. Drive means is provided to engage and drive the drive sprockets. Variable pitch adjustment means is on the sprockets to accomodate for a pitch variation on the conveying member and adjust the sprockets to continue to mesh with the conveying member.

With the above objectives among others in mind, reference is made to the attached drawings.

BRIEF DESCRIPTION OF THE DRAWINGS

In the Drawings:

FIG. 1 is a fragmentary environmental elevation view of a conveyor system embodying the present invention and shown in use on a conventional latex glove manufacturing line;

FIG. 2 is a top plan view taken along the plane of line 2—2 of FIG. 1 of a drive sprocket and an idler sprocket of the system of the invention interconnected with a drive motor and showing a portion of a cable traveling over the drive sprocket and idler sprocket;

DETAILED DESCRIPTION

Figure 3A:
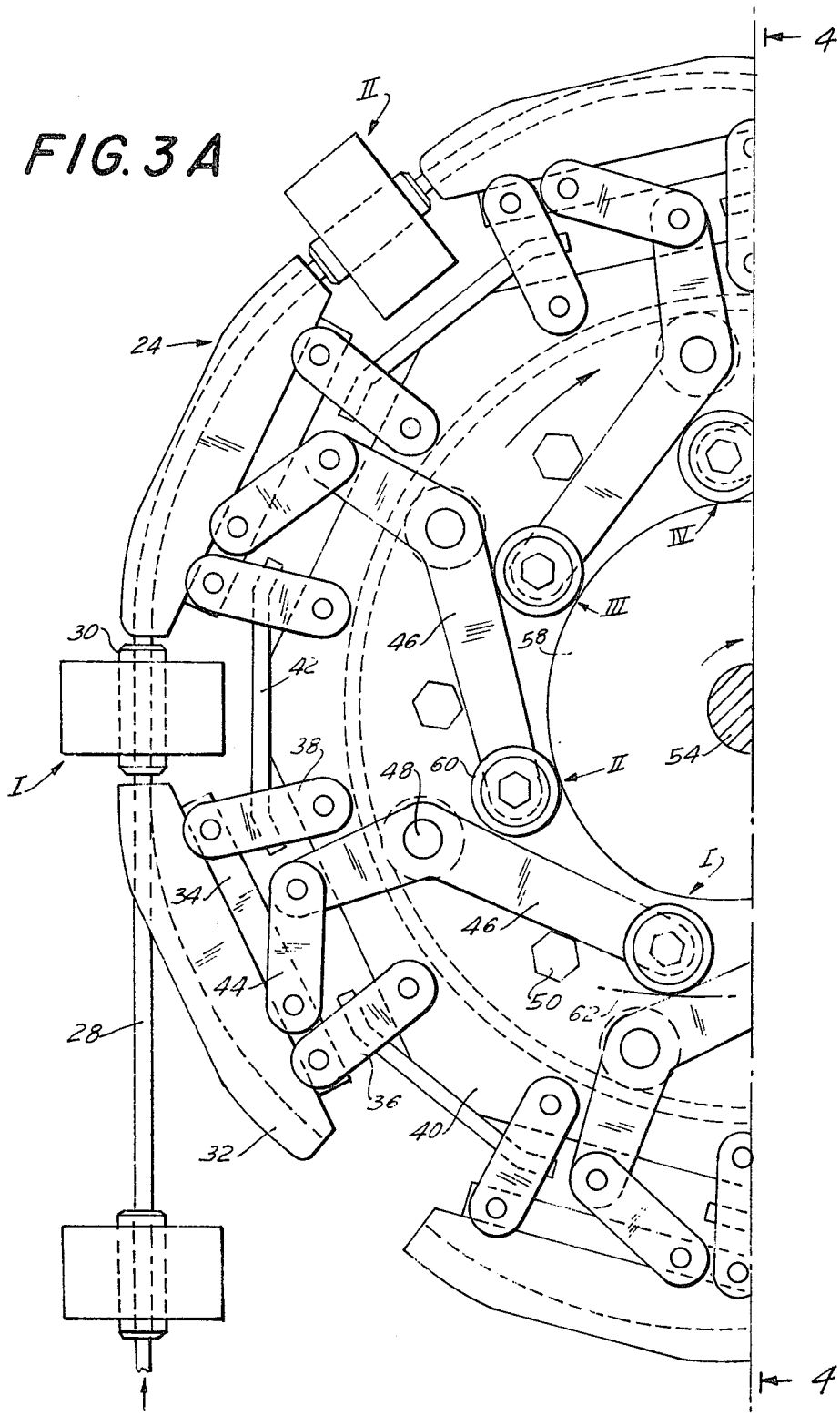
FIG. 3 is a sectional tip view taken along the plane of line 3—3 of FIG. 1 of a drive sprocket of the conveyor system of the invention showing a cable directed therearound.

As stated above, as an example, a conventional type of manufacturing line 20 is shown in FIG. 1 utilizing the variable pitch drive sprockets and idler sprockets of the present invention. The sprockets are equally adaptable for use in many other type of well known cable and chain conveying systems used in manufacturing procedures on a variety of scales from manufacturing small products to relatively large products. The concept of enabling the sprockets to vary pitch to accommodate for change in pitch occurring during use of the cable or chain is adaptable for a variety of different type of manufacturing systems using conveyors.

In glove machine 20, typical work pieces or glove molds 22 are shown and are used to form the latex gloves. During the procedure, the molds are dipped into vats containing liquid latex and are then transported to curing ovens and during the transportation procedure are subjected to changes in direction and orientation such as inverting of the molds. The above referenced patents are adequate to describe the general procedure carried out and structure employed during the molding process and the ultimate results where the molds are stripped of the latex gloves in finished cured form. The molds 20 are mounted to rollers 21 which travel in a track or trolley 23 along the line. The molds are also mounted to buttons 30 on a conveying member or cable 28 located above the trolley 23 and engaged by a conveying system employing drive and idler sprockets.

The present invention deals with the conveying system in general. The number of drive and idler sprockets is a matter of choice depending upon the manufacturing procedure being carried out. The drive sprockets 24 served to drive a conventional type of cable 28, such as the type discussed above, and the idler sprockets 26 serve to guide the cable during its travel path and to facilitate change of direction of the cable for purposes of inverting or reorienting cable and mold directions. The variable pitch drive sprockets 24 and the idler sprockets 26 are designed so that they are capable of being mounted horizontal, vertical or any other annular position.

Cable 28 is fitted with conventional swaged buttons 30. The ends of the buttons 30 are designed to contact the driving elements of the particular type of drive used. Each button 30 on the cable 28 carries the load independently, in succession, through the distance of one pitch. The only sharing of the load between two buttons occurs instantaneously as the load is transferred back to the adjacent following button 30. To maximize the radius at which the cable seats in the shoes 32, and still accommodate the large change in the pitch difference between the sprocket 24 and the cable buttons 30 before the cable is used up, the shoes 32 are bolted on to the hinged mechanism. This allows the shoes to be shimmed out to increase the pitch of the sprocket to correct for part of the cable stretch.

Figure 4:
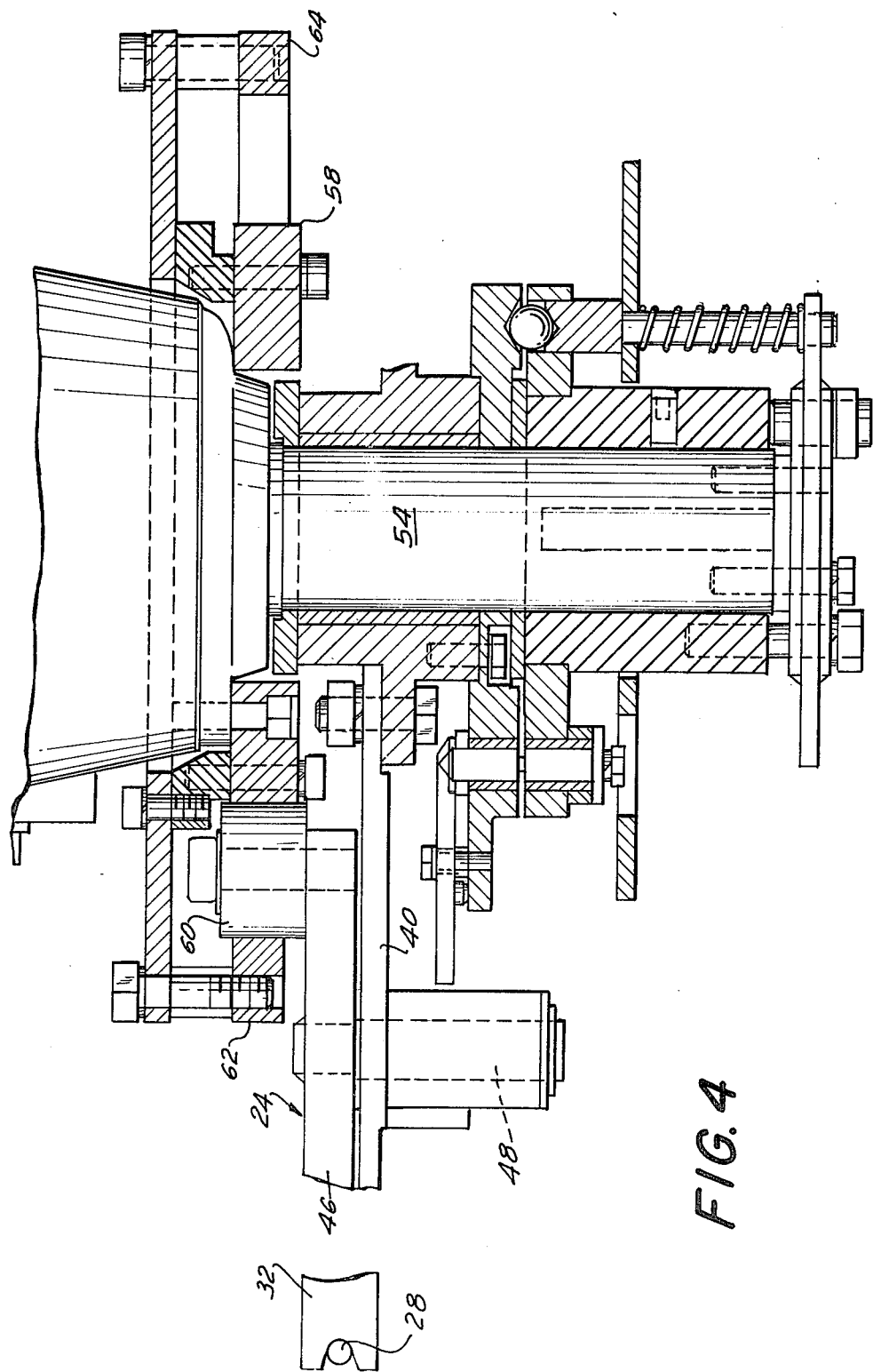
FIG. 4 is a fragmentary sectional elevation view of the drive sprocket of FIG. 3 taken along the plane of line 4—4 of FIG. 3.
Figure 5:
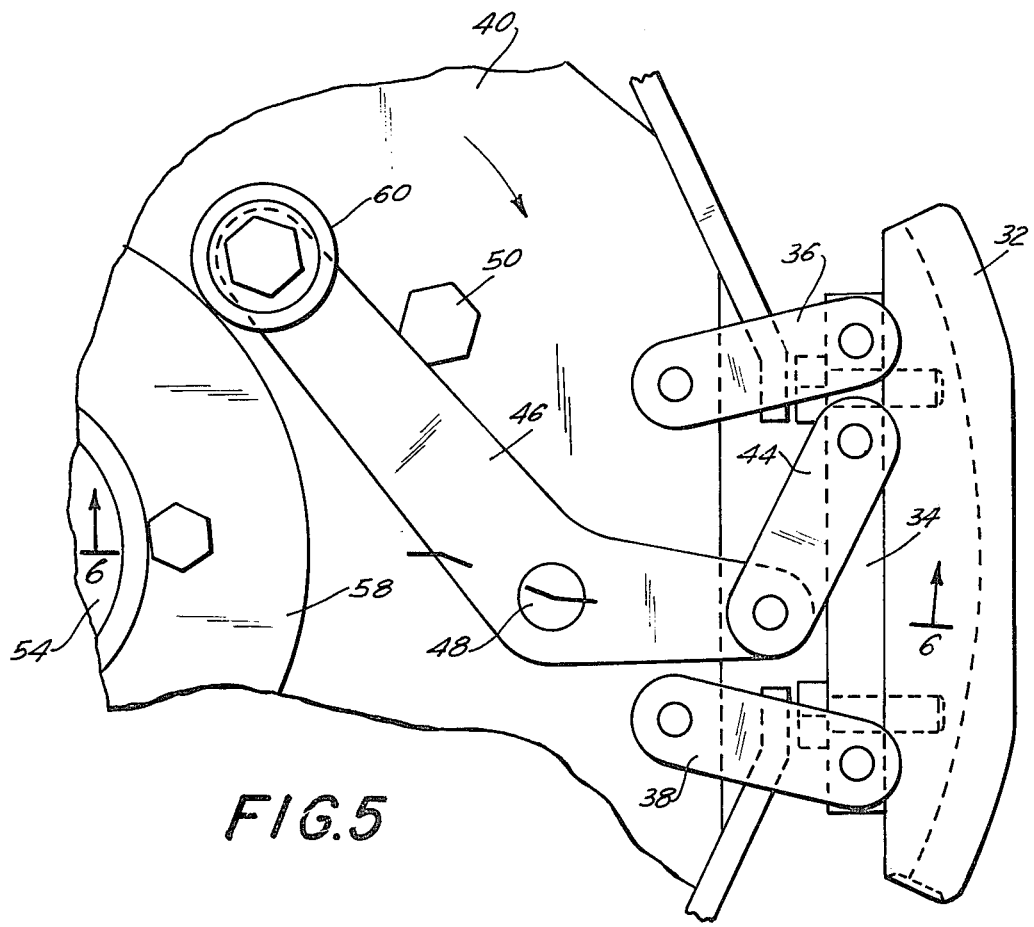
FIG. 5 is a fragmentary plan view of a portion of the drive sprocket of FIG. 3.
Figure 6:
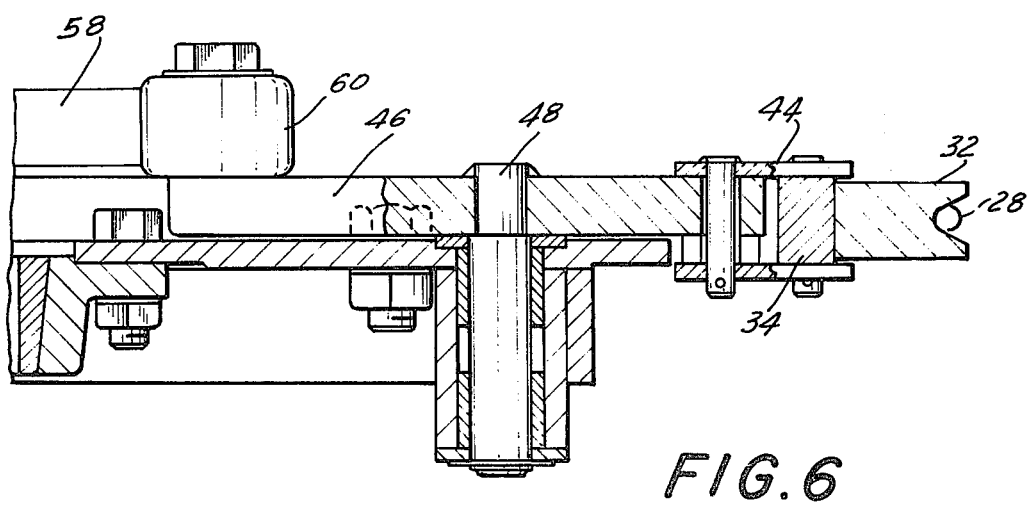
FIG. 6 is a sectional elevation view of the drive sprocket portion depicted in FIG. 5 and taken along the plane of line 6—6 of FIG. 5.

As shown in FIGS. 3 and 4, each cable shoe 32 is bolted to a bar 34. There are 7 shoe assemblies for each drive sprocket 24. Each bar 34 is supported pivotally by two roller chain connecting links 36 and 38 to the base plate 40. Base plate 40 pivotally supports the roller chain connecting links 36 and 38 affording the bar 34 and shoe 32 a modified parallelagram motion path in the plane of the conveyor cable 28. Base plate 40 also supports guides 42 for the motion of the bar 34. Bar 34 has a third roller chain connecting link 44 connected pivotally to it and this link connects pivotally to the cam lever 46. Cam lever 46 has a projecting shaft 48 which mounts rotatable in a bearing supported on the base plate. Base plate 40 also has a stop 50 for the cam lever motion in the outward direction. Base plate 40 has a hub which fastens through the drive shaft 54, directly or through a shear pin hub-switch. The base plate supports 7 equally spaced shoes, bars, length, cam lever assemblies, to form drive sprocket gaps at a pitch which works with the cable button pitch. The internal cam 58 is supported stationary at the center of the drive sprocket 24 at the correct height to engage the cam rollers 60 which are mounted on the end of the cam lever 46. It should be noted that one function of the cam is to act as an inward direction limit or stop on the cam lever rotation.

FIGS. 2 and 3 also show two additional stationary external cams 62 and 64 which also engage the cam roller at the cable button entrance and exit respectively.

In operation as shown in FIG. 3, the shoe 32 at the position IV is driving, the shoe 32 at position III about to drive, the cable button 30 at position I entered into the gap, and the button 30 at position V has left the gap.

In tracing the travel path of a button 30 through the drive sprocket 24, at position I the external cam 62 has positioned the cam roller 60 against the cam 58, thus retarding the shoe 32 to position I. This has enlarged the entrance gap to provide entry of the button 30 into the gap with no contact of button end to shoe end. Note that the shoe 32 is moved closer to the button 30 beyond position I, sliding only the leading part of the shoe groove against the cable 28 with minimum cable wrap. This is done to minimize the sliding of cable 28 in all shoes 32 which occurs at each load transfer from button to button.

At position II the cam roller 60 is on the concentric circular part of the cam face and the button and gap are rotating with no relative position change.

At position III cam roller 60 is still on the concentric circular part of the cam. However, the space between the shoe end and the button is diminishing and shoe 32 at position III is about to receive the load. This is due to the fact that at position IV the cam follower has rolled off of the concentric circular path onto a diminished radius cam surface allowing shoe 32 at position IV and button 30 at position IV with the cable and other buttons to retard by sliding through all shoes in cable contact, except shoe 32, at position IV. The difference in the cable tension from the entering to the leaving side of the drive sprocket provides the force to hold the cam roller at position IV against the cam and to overcome the cable-shoe friction against sliding.

A little beyond position IV this cable sliding action will bring button 30 at position III in contact with shoe 32 at position III and the load will then be transmitted to the cam through shoe 32 at position III and cam roller 60.

At position V the cam roller 60 reaches the concentric minimum radius of the cam due to the action of the external exit cam 64. This has separated the end of shoe 32 at position V from button 30 at position V, thus allowing the button 30 to withdraw without shoe-end and button-end contact from the gap at position V as the cable follows the exit track on a tangential, separating path from the shoe circular path.

It should be kept in mind that with a new minimum pitch cable, the button at position III will be at a maximum distance from the shoe at position III leading edge, and the load transfer will take place in a more advanced position than with an older cable with a larger pitch. It should also be kept in mind as well that the load transfer occurs by a compressive action between the button and shoe end in a direction axial to the cable, rather than with a shearing action in a transverse direction to the cable.

Figure 7A:
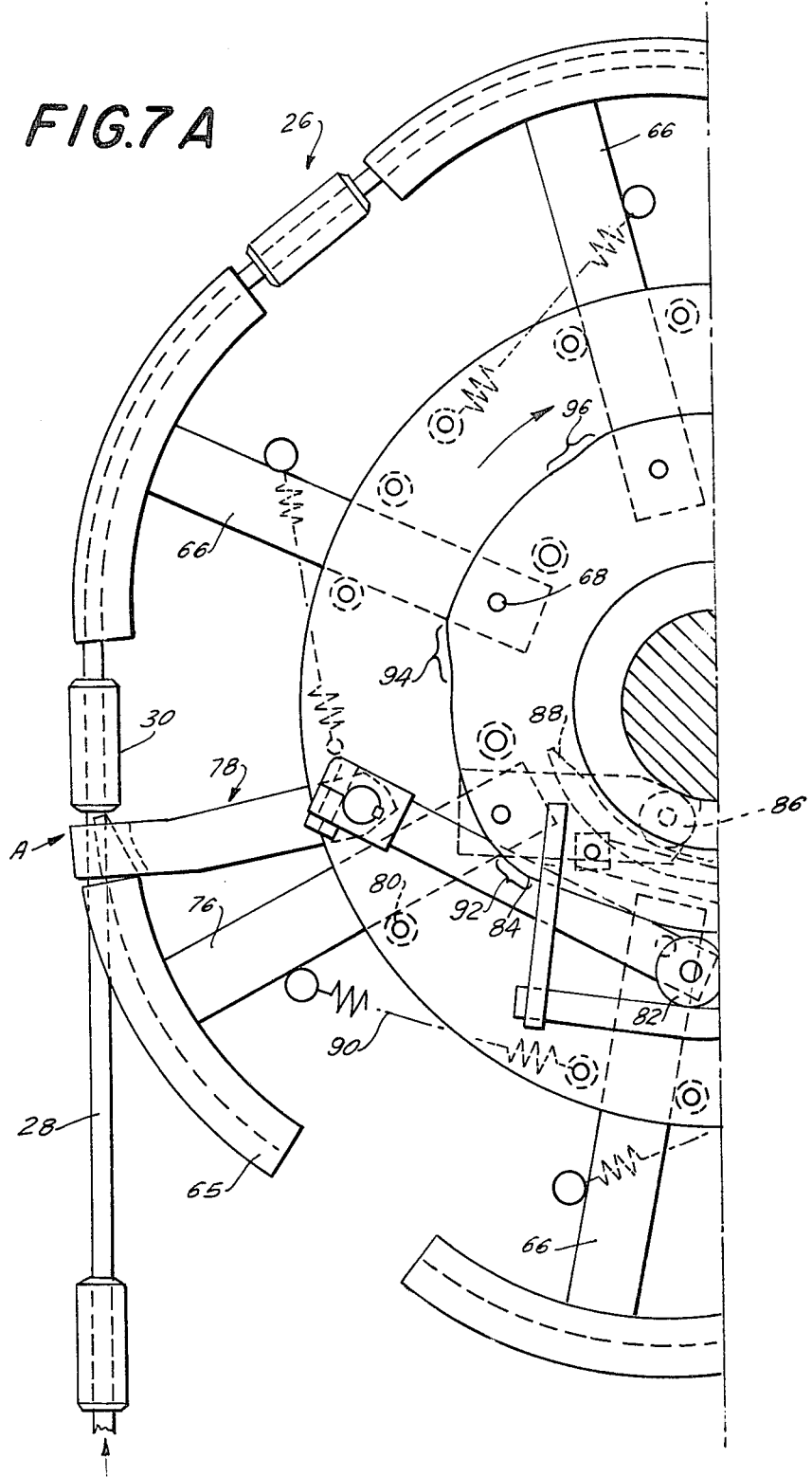
FIG. 7 is a sectional top view taken along the plane of line 7—7 of FIG. 1 of an idler sprocket of the conveyor system of the invention showing a cable portion traveling therearound.
Figure 8:
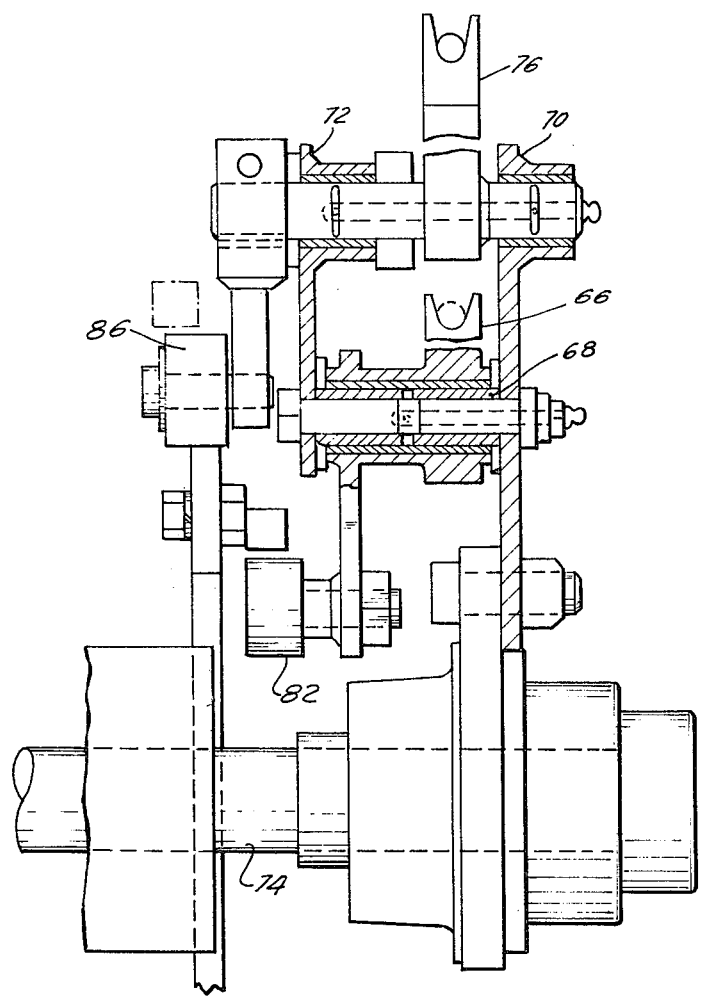
FIG. 8 is a sectional elevation view of a portion of the idler sprocket of FIG. 7 taken along the plane of line 8—8 of FIG. 7.

Turning to consideration of the idler sprockets, the details of one of the idler sprockets 26 are shown in FIGS. 7 and 8. As stated above, the number of sprockets used is a matter of choice and they can be mounted in vertical or horizontal position.

Sprocket 26 as shown in FIGS. 7 and 8 includes a plurality of shoe arms 66. Each shoe arm 66 is pivotally mounted on spacer shaft 68. Spacer shaft 68 is clamped between hub plate 70 and plate 72. Hub plate 70 is mounted rotatably on the supporting shaft 74.

In addition to five shoe arms 66 in the depicted embodiment, there are two indexed shoe arms 76 with mounting identical to each shoe 66 mounting. Each index shoe arm 76 is the same as each shoe arm 66, except that the leading end of the shoe is trimmed to work freely inside index yoke lever assembly 78. The rotation of all seven shoe arms is limited by plate spacers 80.

The seven shoe arm supports are positioned to form seven equally spaced idler sprocket gaps in a plane and at a pitch which works with the cable button pitch. It should be noted that the gap pitch should be preferably slightly less than the pitch of the buttons on a new cable.

The shoe length is set by the requirement to have 1/16th inch minimum working clearance between the shoe ends and button and the length of the button 2 11/16 and four times the total cable stretch per pitch or ¾ inch. Two index yoke levers 78 are used to correct the effect of the maximum pitch growth, 3/16 inches, twice per sprocket revolution. This allows for longer shoes with larger radius cable seats.

The index yoke lever assemblies 78 are mounted rotatably between plates 70 and 72 and support cam roller 82. Index lever cam 84 is mounted stationary on the support structure in a plane to work with the cam roller 82.

Shoe arm 76 supports cam follower 86. Shoe retarding cam 88 is mounted stationary on cam 84. In the case of vertically mounted idler sprockets, springs 90 are mounted to counter balance the weight of each shoe.

In operation, the friction of the cable 28 under tension seated in the shoes causes the sprocket 26 to rotate about the anti-friction hub as the conveyor cable 28 travels. As each shoe arm 66 and 76 approaches the incoming or engaging cable position, its cam follower 86 contacts the shoe retard cam 88. The interaction of the cam and roller assures that each shoe is retarded against the stop 80 as the cable 28 winds into the shoe groove.

As each index yoke lever assembly 78 approaches the incoming cable position, its cam roller 82 retards the yoke due to its interaction with the index lever cam guide. This prevents the yoke from blocking the button entrance into the gap. As the yoke lever continues to rotate, its cam roller 82 interacts with the cam 84 on step 92. The effect of this interaction between roller 82 and cam 84 is to advance the yoke far enough to contact a cable button 30 if it is in position A. Position A is the most retarded position relative to the entering gap occurring in normal operation of idler sprocket 26.

As sprocket rotation continues, roller 82 proceeds to step 94 on cam 84 along a concentric circular arc. (Cam steps 92, 94 and 96 are shown on cam 84, whereas shoes 65 and button 30 are shown at cam step 92 only.) Therefore the gap, yoke and button remain in fixed relationship in their circular route. The purpose of dividing cam action into steps is to cause the sprocket "shift," defined below, to occur while the entering shoe 65 is not in contact with the cable 28, thus allowing the shoe to engage cable 28 in maximum retard position. Further sprocket rotation results in more yoke advancement. Since the yoke is already in contact with button 30, the yoke advancement tends to advance the button 30 and hence the cable 28. The advancing cable 28 advances the three or four shoes 65 which are ahead of the yoke button, because they are free to rotate about their spacer shafts 68. However, since the cable 28 is turning the sprocket 26, what actually happens to accomplish this is that the plates 70 and 72, and parts attached thereto, retard by temporarily slowing rotation about supporting shaft 74. This action is called the idler sprocket "shift". More "shift" will occur as a result of the interaction of cam roller 82 and cam step 96.

It should be noted that after the first "shift" the entrance gap is increased more than enough to accommodate even the longest cable button pitch. This is because the "shift" cam steps 94 and 96 widen the engaging gap enough to allow four successive buttons 30 to be 3/16th inch over pitch each for a total of ¾ inches.

With a new cable button pitch slightly greater than the idler sprocket pitch, sprocket 26 turns several complete turns between "shifts", because no shift occurs until a yoke contacts a button during its advance. Only toward the end of the cable life does the idler sprocket shift twice per turn.

When the sprocket 26 is mounted in a horizontal plane, it will operate either with or without springs while the springs are desirable when the sprocket is mounted in a vertical position as discussed above.

It should be kept in mind that the proper functioning of the idler sprocket 26 depends on the relative magnitude of several frictional forces. For example, if the central bearing on supporting shaft 74 should drag, the shoes 65 and cable contact would shift independently of yoke-button contact.

The idler sprocket 26 which operates entirely on a very small amount of energy derived from the cable 28 prevents any cable button-shoe and contact. This is accomplished without sliding of the cable 28 in the shoe grooves.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A conveyor system comprising; at least one drive sprocket, at least one idler sprocket, a conveying member adapted to carry a work load and to mesh with the sprockets, support structure with the sprockets mounted thereon in a predetermined arrangement in position to mesh with the conveying member to drive and guide conveying member along a predetermined path, spaced elements on the sprockets and speced elements on the conveying member to be spaced from one another in alternate side by side arrangement when the conveying member is meshed with the sprockets, drive means to drive the drive sprocket, means for causing each element on the sprocket to contact an element on the conveying member at a point adjacent the exit of the conveying member from meshing with the sprocket to transfer the load at an advanced position by compressive action between the element of the conveyor and the element of the sprocket in a direction axial to the conveying member, and variable pitch adjustment means on the sprockets to automatically accommodate for a pitch variation on the conveying member and adjust the sprocket circumferentially between entry and exit of the meshing of the conveying member and the sprocket to continue to mesh with the conveying member without the spaced elements on the sprockets contacting the spaced elements on the conveying member at the entry and exit of the meshing of the conveying member and sprocket.

2. The invention in accordance with claim 1 wherein there are two drive sprockets and 38 idler sprockets arranged to carry and direct a cable containing glove molds on a machine for manufacturing latex gloves.

3. The invention in accordance with claim 1 wherein the conveying member is in the form of a cable with buttons mounted thereon at spaced intervals to provide a pitch for the cable.

4. The invention in accordance with claim 3 wherein the cable is a ⅜th inch diameter 7 by 19 galvanized steel aircraft cable fitted with swaged buttons and having 12 3/22 inch pitch, each button being 1 inch in outside diameter by 2 11/16 inches long and arranged to contact drive surfaces on each drive sprocket.

5. The invention in accordance with claim 1 wherein each drive sprocket is designed to operate through approximately one and one half circular pitches of the conveying member contact.

6. A conveyor system comprising; at least one drive sprocket, at least one idler sprocket, a conveying member adapted to carry a work load and to mesh with the sprockets, support structure with the sprockets mounted thereon in a predetermined arrangement in position to mesh with the conveying member to drive and guide the conveying member along a predetermined path, spaced elements on the sprockets and spaced elements on the conveying member to be spaced from one another in alternate side by side arrangement when the conveying member is meshed with the sprockets, drive means to drive the drive sprocket, and variable pitch adjustment means on the sprockets to automatically accommodate for a pitch variation on the conveying member and adjust the sprocket to continue to mesh with the conveying member without the spaced elements on the sprockets contacting the spaced elements on the conveying member, the conveying member is a cable with spaced buttons thereon, each drive sprocket is provided with a plurality of radially extending sprocket bars terminating in a receiving shoe adapted to removably seat the cable therein as it travels about the drive sprocket, each shoe being fixed to a hinged mechanism on the sprocket which permits the shoes to be shimmed out to increase the pitch of the sprocket to correct for at least part of the cable stretch and thereby maximize the radius at which the cable seats in the shoes and accommodate the change in the pitch difference between the sprocket and the cable buttons before the cable is used up.

7. A conveying system comprising; at least one drive sprocket, at least one idler sprocket, a conveying member adapted to carry a work load and to mesh with the sprockets, support structure with the sprockets mounted thereon in a predetermined arrangement in position to mesh with the conveying member to drive and guide the conveying member along a predetermined path, drive means to drive the drive sprocket, variable pitch adjustment means on the sprockets to automatically accommodate for a pitch variation on the conveying member and adjust the sprocket to continue to mesh with the conveying member, the conveying member is a cable with spaced buttons thereon, each drive sprocket includes a plurality of bars having a cable receiving shoe mounted on the outward side thereof, linkage means pivotally coupling the bars to the sprocket base and designed to afford the bar and shoe a modified parallelagram motion path in the plane of the cable traveling on the drive sprocket, a predetermined cam surface on the sprocket, the linkage means connecting the bars to cam followers for engaging the cam surface, the cam surface being stationary and the cam followers being rotatable with respect to the sprocket so that the bars and interconnected shoes are shifted in response to the cam followers traveling over the cam surface to accommodate for pitch changes and to provide a cam drive for the cable.

8. The invention in accordance with claim 7 wherein the conveying member is a cable with spaced buttons thereon in position to contact the shoes of the drive sprocket as the drive sprocket drives the cable, each bar on the drive sprocket being supported pivotally by a pair of roller chain connecting links to a base plate of the sprocket, the base plate also supporting guides for the motion of the bar, a third roller chain connecting link connected pivotally to the bar and to a cam lever, the cam lever having a projecting shaft rotatably mounted in a bearing supported on the base plate of the sprocket, a stop on the base plate for the cam lever to restrain motion in the outward direction, a hub on the base plate interconnected with the drive shaft, a predetermined number of shoe and bar assemblies and interconnected linkages on the sprocket to form drive sprocket gaps therebetween at a pitch which coordinates with the cable button pitch, the stationary cam surface being in the form of an internal cam located at the center of the drive sprocket at the correct height to engage cam rollers mounted on the end of the cam lever and vary the pitch of the drive sprocket, the stationary cam also acting to limit the movement of the inward directional movement of the cam lever during rotation.

9. The invention in accordance with claim 8 wherein there are seven equally spaced shoe and bar assemblies and interconnecting linkages on the drive sprocket.

10. The invention in accordance with claim 7 wherein an entrance stationary external cam is provided to guide cam follower structure for each linkage assembly into engagement with the stationary cam surface adjacent the location of the entrance of each cable button into engagement with the drive sprocket, and a stationary exit cam mounted externally on the drive sprocket to engage the cam follower structure of the linkage for each bar and shoe assembly to assist in directing the cable from the shoe as it exits from the drive sprocket.

11. A conveyor system comprising; at least one drive sprocket, at least one idler sprocket, a conveying member adapted to carry a work load and to mesh with the sprockets, support structure with the sprockets mounted thereon in a predetermined arrangement in position to mesh with the conveying member to drive and guide the conveying member along a predetermined path, drive means to drive the drive sprocket, variable pitch adjustment means on the sprockets to automatically accommodate for a pitch variation on the conveying member and adjust the sprocket to continue to mesh with the conveying member, each idler sprocket includes a plurality of pivotally mounted shoe assemblies, each shoe assembly including a shoe arm extending outwardly from the sprocket and terminating in a shoe, stationary cam means on the sprocket, cam follower means on the shoe assemblies adapted to follow the stationary cam and facilitate variation in pitch between sprocket arms to accommodate for pitch variation in the conveying member passing over the idler sprocket.

12. The invention in accordance with claim 11 wherein at least one of the shoe assemblies is associated with an index yoke lever assembly pivotally mounted on the idler sprocket, cam follower means on the index yoke lever assembly to engage with a stationary cam surface on the sprocket for shifting the index yoke lever assembly to adjust the incoming gap between shoe assemblies on the sprocket and to engage and guide the conveying member as it travels over the idler sprocket.

13. The invention in accordance with claim 12 wherein a stationary cam surface is positioned to cooperate with the stationary cam on the sprocket and the cam followers on the shoe assemblies to operate in assisting to retard a shoe adjacent the location where the conveyor member is received onto the idler sprocket thereby increasing the gap at the entrance location between sprockets and accommodating for pitch variation in the conveying member.

14. The invention in accordance with claim 11 wherein each shoe assembly is restricted in its pivotal movement by stops so that the shoe assemblies have limited pivotal movement to accommodate pitch variation by adjustment of the gap between adjacent shoe assemblies.

15. The invention in accordance with claim 11 wherein each idler sprocket includes a plurality of pivotally mounted shoe assemblies, each shoe assembly including a shoe arm extending outwardly from the sprocket and terminating in a shoe, at least one of the shoe assemblies engaged by an index yoke lever assembly pivotally mounted on the idler sprocket, the shoe assemblies being spaced about the periphery of the idler sprockets so as to have a pitch which will permit them to accept the pitch of the conveying member brought into contact therewith, each index yoke lever assembly having a cam follower thereon in position to cooperate with a stationary cam to retard the index yoke lever asembly at the location where the conveying member engages with the idler sprockets so as to provide a maximum gap to accommodate pitch variation in the conveying member, the cam follower on the index yoke lever then engaging with a stationary cam on the idler sprocket as the conveying member passes over the idler sprocket to assist in passage thereof and accommodation of the pitch variation, each shoe arm assembly including a shoe arm cam follower adapted to engage a shoe retarding cam mounted in stationary position so that the shoe on the shoe assembly is retarded at the location where the conveying member engages the idler sprocket thus providing the desired entrance gap for receipt of the conveying member onto the idler sprocket.

16. The invention in accordance with claim 15 wherein there are seven shoe arm assemblies spaced about the periphery of each idler sprocket with two of the shoe arm assemblies including index shoe arms to cooperate with two index yoke lever assemblies respectively, plate spacers positioned on the idler sprocket to limit the rotation of all seven shoe arms, and the seven shoe arm assemblies being positioned to form seven equally spaced idler sprocket gaps in a plane and at a pitch which works with the conveying member in the form of a cable having spaced buttons at a predetermined pitch.

17. A drive sprocket adapted for use as part of a conveyor system utilizing a conveying member adapted to carry a work load and to mesh with the drive sprocket, the conveying system including a support structure and drive means to drive the drive sprocket, the drive sprocket comprising; means for mounting the sprocket on the support structure, means for connecting the drive sprocket to the drive means of a conveyor system, conveying member receiving means on the drive sprocket to engage and drive the conveying member, spaced elements on the sprocket and spaced elements on the conveying member to be spaced from one another in alternate side by side arrangement when the conveying member is meshed with the sprocket, means for causing each element on the sprocket to contact an element on the conveying member at a point adjacent the exit of the conveying member from meshing with the sprocket to transfer the load at an advanced position by compressive action between the element of the conveyor and the element of the sprocket in a direction axial to the conveying member, and variable pitch adjustment means on the sprocket to accomodate for a pitch variation on the conveying member and adjust the sprocket circumferentially between entry and exit for the meshing of the conveying member and the sprocket to continue to mesh with the conveying member without the spaced elements on the sprocket contacting the spaced elements on the conveying member at the entry and exit of the meshing of the conveying member and sprocket.

18. The invention in accordance with claim 17 wherein the conveying member is in the form of a cable with buttons mounted thereon at spaced intervals to provide a pitch for the cable.

19. The invention in accordance with claim 17 wherein each drive sprocket is designed to operate through 180 degrees of arc so that the incoming and leaving tracks for the cable are parallel.

20. A drive sprocket adapted for use as part of a conveyor system utilizing a conveying member adapted to carry a work load and to mesh with the drive sprocket, the conveying system including a support structure and drive means to drive the drive sprocket, the drive sprocket comprising; means for mounting the sprocket on the support structure, means for connecting the drive sprocket to the drive means of a conveyor system, conveying member receiving means on the drive sprocket to engage and drive the conveying member, spaced elements on the sprocket and spaced elements on the conveying member to be spaced from one another in alternate side by side arrangement when the conveying member is meshed with the sprocket, and variable pitch adjustment means on the sprocket to accomodate for a pitch variation on the conveying member and adjust the sprocket to continue to mesh with the conveying member without the spaced elements on the sprocket contacting the spaced elements on the conveying member, the conveying member is a cable with spaced buttons thereon, each drive sprocket is provided with a plurality of radially extending sprocket bars terminating in a receiving shoe adapted to removably seat the cable therein as it travels about the drive sprocket, each shoe being fixed to a hinged mechanism on the sprocket which permits the shoes to be shimmed out to increase the pitch of the sprocket to correct for at least part of the cable stretch and thereby maximize the radius at which the cable seats in the shoes and accomodate the change in the pitch difference between the sprocket and the cable buttons before the cable is used up.

21. A drive sprocket adapted for use as part of a conveyor system utilizing a conveying member adapted to carry a work load and to mesh with the drive sprocket, the conveying system including a support structure and drive means to drive the drive sprocket, the drive sprocket comprising, means for mounting the sprocket on the support structure, means for connecting the drive sprocket to the drive means of a conveyor system, conveying member receiving means on the drive sprocket to engage and drive the conveying member, variable pitch adjustment means on the sprocket to accomodate for a pitch variation on the conveying member and adjust the sprocket to continue to mesh with the conveying member, the conveying member is a cable with spaced buttons thereon, each drive sprocket includes a plurality of bars having a cable receiving shoe mounted on the outward side thereof, linkage means pivotally coupling the bars to the sprocket base and designed to afford the bar and shoe a modified parallelagram motion path in the plane of the cable traveling on the drive sprocket, a predetermined cam surface on the sprocket, the linkage means connecting the bars to cam followers for engaging the cam surface, the cam surface being stationary and the cam followers being rotatable with respect to the sprocket so that the bars and interconnected shoes are shifted in response to the cam followers travelling over the cam surface to accommodate for pitch changes and to provide a cam drive for the cable.

22. The invention in accordance with claim 21 wherein the conveying member is a cable with spaced buttons thereon in position to contact the shoes of the drive sprocket as the drive sprocket drives the cable, each bar on the drive sprocket being supported pivotally by a pair of roller chain connecting links to a base plate of the sprocket, the base plate also supporting guides for the motion of the bar, a third roller chain connecting link connected pivotally to the bar and to a cam lever, the cam lever having a projecting shaft rotatably mounted in a bearing supported on the base plate of the sprocket, a stop on the base plate for the cam lever to restrain motion in the outward direction, a hub on the base plate interconnected with the drive shaft, a predetermined number of shoe and bar assemblies and interconnected linkages on the sprocket to form drive sprocket gaps therebetween at a pitch which coordinates with the cable button pitch, the stationary cam surface being in the form of an internal cam located at the center of the drive sprocket at the correct height to engage cam rollers mounted on the end of the cam lever and vary the pitch of the drive sprocket, the stationary cam also acting to limit the movement of the inward directional movement of the cam lever during rotation.

23. The invention in accordance with claim 22 wherein there are seven equally spaced shoe and bar assemblies and interconnecting linkages on the drive sprocket.

24. The invention in accordance with claim 23 wherein an entrance stationary external cam is provided to guide cam follower structure for each linkage assembly into engagement with the stationary cam surface adjacent the location of the entrance of each cable button into engagement with the drive sprocket, and a stationary exit cam mounted externally on the drive sprocket to engage the cam follower structure of the linkage for each bar and shoe assembly to assist in directing the cable from the shoe as it exits from the drive sprocket.

25. An idler sprocket adapted to be utilized in a conveyor system which includes drive means, a conveying member adapted to carry a work load and to mesh with the sprocket, support structure with the sprocket mounted thereon in a predetermined location in position to mesh with the conveying member to guide the conveying member along a predetermined path as it is driven by the drive means, the idler sprocket comprising; a plurality of pivotally mounted shoe assemblies, each shoe assembly including a shoe arm extending outwardly from the sprocket and terminating in a shoe, and variable pitch adjustment means on the idler sprocket to accommodate for a pitch variation on the conveying member and adjust the sprocket to continue to mesh with the conveying member.

26. The invention in accordance with claim 25 wherein the shoe assemblies are spaced about the periphery of the idler sprocket so as to have a pitch which will permit them to accept the pitch of the conveying member brought into contact therewith, limit means to limit the rotation of the shoe assemblies and accordingly the gaps therebetween thus providing for variable pitch adjustment means on the idler sprocket.

27. The invention in accordance with claim 26 wherein each shoe assembly has a cam follower mounted thereon adapted to interengage with a shoe retarding cam mounted in stationary position so as to retard each shoe assembly at the location where the conveying member engages with the idler sprocket thereby providing the desired gap between shoe arms at that location and facilitating accommodation of the idler sprocket for pitch variation in the conveying member.

28. The invention in accordance with claim 25 wherein at least one of the shoe assemblies is positioned to cooperate with an index yoke lever assembly pivotally mounted on the idler sprocket, each index yoke lever assembly including a yoke lever cam follower in position to engage with an entrance cam to retard the position of the yoke lever at the location of entrance of the conveying means onto the idler sprocket thereby facilitating the provision of the desired gap at the entrance location to accommodate for pitch variation in the conveying member, the yoke lever cam follower also adapted to engage with a stationary guide cam surface on the idler sprocket so that as the idler sprocket rotates with the conveying member traveling thereover the yoke lever will assist in shifting of the base plate of the idler sprocket and accommodation of the idler sprocket pitch to variation in pitch of the conveying member.

29. The inventiion in accordance with claim 28 wherein there are seven shoe arm assemblies spaced about the periphery of the idler sprocket with two of the shoe arm assemblies including index shoe arms to cooperate with two index yoke lever assemblies respectively, plate spacers positioned on the idler sprocket to limit the rotation of all seven shoe arms, and the seven shoe arm assemblies being positioned to form seven equally spaced idler sprocket gaps in a plane and at a pitch which works with the conveying member in the form of a cable having spaced buttons at a predetermined pitch.

* * * * *